United States Patent [19]
Schneekloth

[11] 3,911,346
[45] Oct. 7, 1975

[54] NUMERICAL CONTOURING CONTROL FOR A FLAMECUTTING TOOL

[75] Inventor: Ulrich Schneekloth, Waynesboro, Va.

[73] Assignee: General Electric Company, Salem, Va.

[22] Filed: Aug. 20, 1974

[21] Appl. No.: 498,938

[52] U.S. Cl. .............. 318/567; 318/572; 318/574; 318/603; 83/17; 235/151.11
[51] Int. Cl.² ................... G05B 19/22; B23B 3/36
[58] Field of Search ......... 318/567, 569, 570, 571, 318/572, 573, 574, 603; 235/151.11; 83/17; 219/64, 68, 119

[56] References Cited
UNITED STATES PATENTS

| | | |
|---|---|---|
| 3,449,540 | 6/1969 | Yanko et al. .................. 318/568 |
| 3,492,552 | 1/1970 | Usami et al. .................. 318/574 |
| 3,641,849 | 2/1972 | Kinney ......................... 318/572 |
| 3,684,874 | 8/1972 | Kelling ....................... 235/151.11 |

*Primary Examiner*—Robert K. Schaefer
*Assistant Examiner*—John J. Feldhaus
*Attorney, Agent, or Firm*—W. C. Bernkopf; J. H. Beusse

[57] ABSTRACT

A numerical contouring control for a flamecutting tool having a plurality of torches. Control circuits are provided for rotating the flamecutter head so as to automatically maintain the longitudinal axis of the flamecutter perpendicular to the contouring path direction.

3 Claims, 5 Drawing Figures

NUMERICAL CONTOURING CONTROL FOR A FLAMECUTTING TOOL

BACKGROUND OF THE INVENTION

This invention relates to numerical contouring controls for a machine tool, and, more particularly, to a numerical contouring control for a flamecutting tool in which a fixed angle is automatically maintained between the longitudinal axis of the flamecutter and the contouring path direction.

When a numerical control is used to control a plurality of tools, such as a flamecutting tool having a plurality of torches, it is desirable to maintain a fixed angle, such as ninety degrees, between the longitudinal axis of the torches and the commanded path direction.

U.S. Pat. No. 3,492,552, Usami et al, describes a numerical control for a flamecutting tool which is capable of cutting along successive straight line segments. In that patent, perpendicularity between the longitudinal axis of the flamecutting torches and the direction of the next straight line segment is maintained by executing a tool rotation command programmed on the paper tape.

It would be desirable to have a numerically controlled, multiple torch, flamecutting tool capable of cutting curvilinear shapes. Furthermore, it would be desirable to eliminate the need for programming separate flamecutter torch rotation commands in order to perpendicularly align the longitudinal axis of the flamecutting torches with the initial direction of the next commanded path.

It is, therefore, a primary object of this invention to provide an improved numerical contouring control for a multiple torch flamecutter.

Another object of this invention is to provide a numerically controlled multiple torch flamecutter capable of cutting a curvilinear shape.

And yet another object of this invention is to provide a numerically controlled multiple torch flamecutter that automatically maintains the longitudinal axis of the torches perpendicular to the commanded path direction.

SUMMARY OF THE INVENTION

In accordance with this invention, there is provided a numerical contouring control for a flamecutting tool having a plurality of torches. The control generates a first signal consisting of a train of pulses wherein each pulse represents an incremental angular change of the contouring path and a second signal indicating the direction of the angular change. These two signals are utilized to rotate the flamecutting head so as to maintain a fixed angle between the longitudinal axis of the flamecutter head and the direction of the contouring path.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1A:
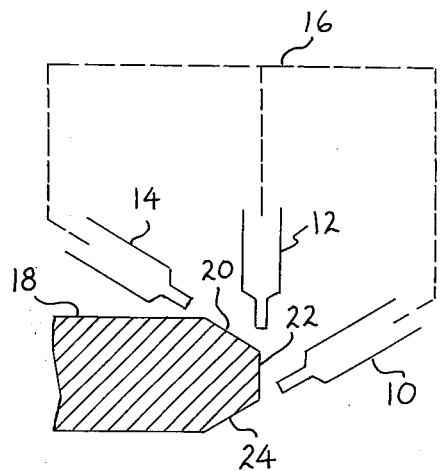
FIGS. 1a, 1b, and 1c are schematic views of a multiple torch flamecutting tool in relation to a workpiece.
Figure 1B:
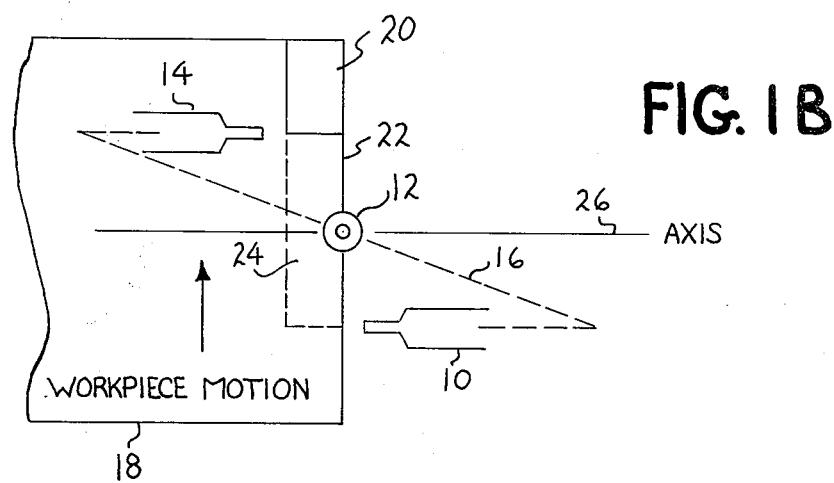
Figure 1C:
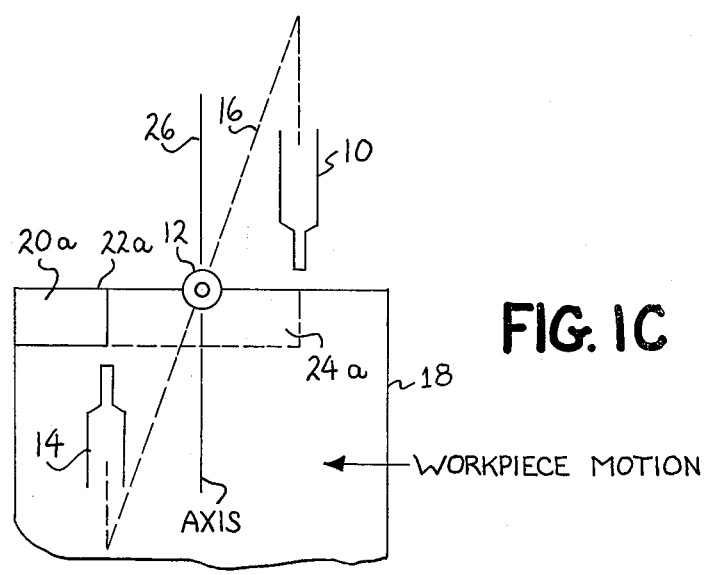

FIG. 1 illustrates a flamecutting tool in which the tool consists of three torches 10, 12, 14 mounted on a single head indicated schematically by dashed line 16. As shown in the front view of FIG. 1a, the mounting angle of the torches can be adjusted so that the machined edge of workpiece 18 can include, for example, the vertical surface 22 and the two beveled surfaces 20 and 24. FIG. 1b is a top view of the flamecutting tool depicted in FIG. 1a and machining a workpiece 18 which is moving toward the top of the page relative to the flamecutting tool. In order to machine the surfaces 20, 22, and 24, as shown in FIGS. 1a, the longitudinal axis 26 of the torches 12, 14, 16 must be perpendicular to the direction of workpiece motion. FIG. 1c illustrates that in order to keep the same machined edge shape 20a, 22a, 24a when the workpiece 18 is moving toward the left edge of the page, it is necessary to rotate the head 16 so that the longitudinal axis of the torches is perpendicular to the direction of workpiece motion. It is clear from the above discussion that if the workpiece is moving in a curvilinear path with respect to the flamecutting tool, the flamecutter head 16 must be continually rotated so that the longitudinal axis of the torches is maintained at right angles to the direction of the commanded path.

Figure 2A:
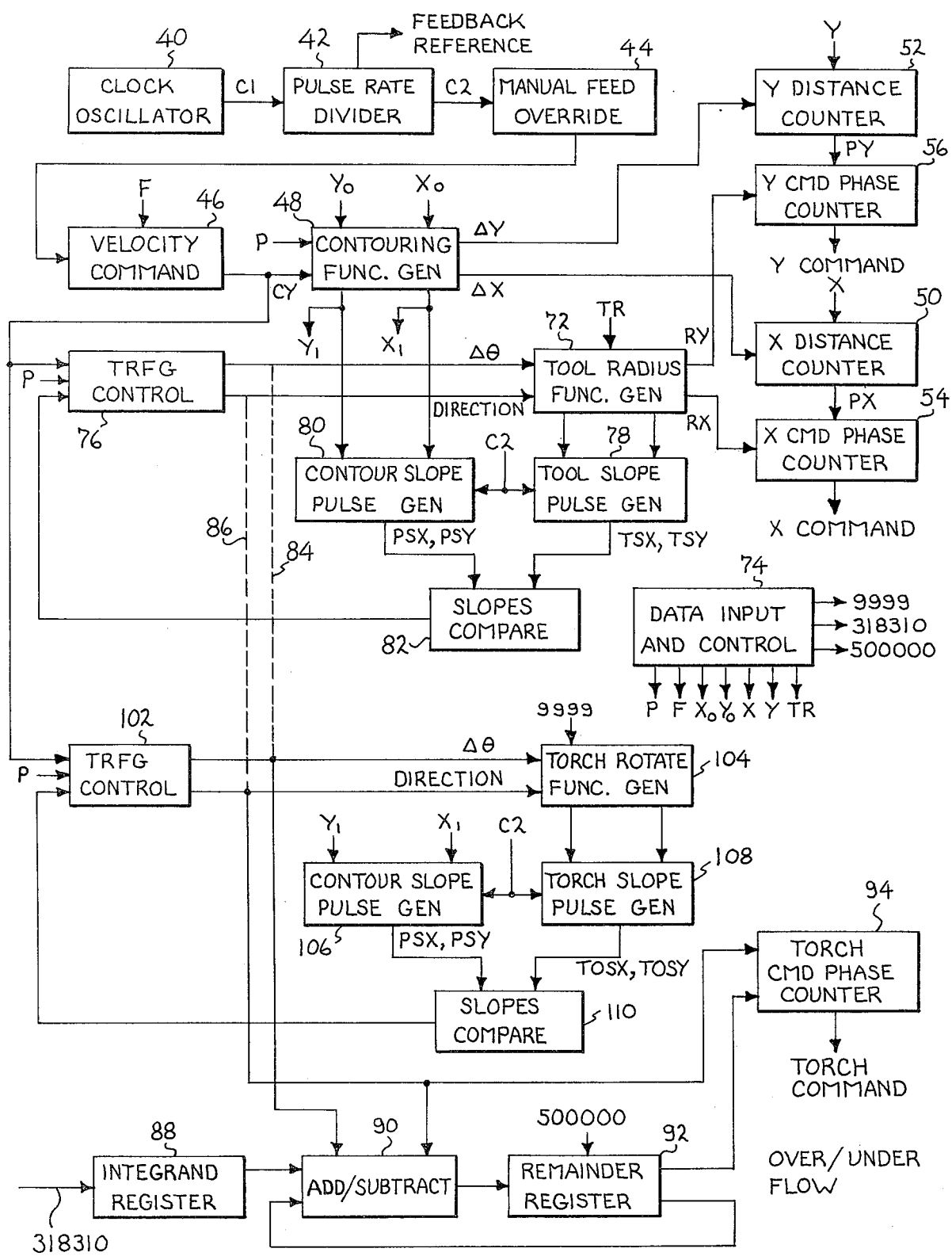
FIGS. 2a and 2b show a block diagram of an embodiment of the numerical control system of the present invention.
Figure 2B:
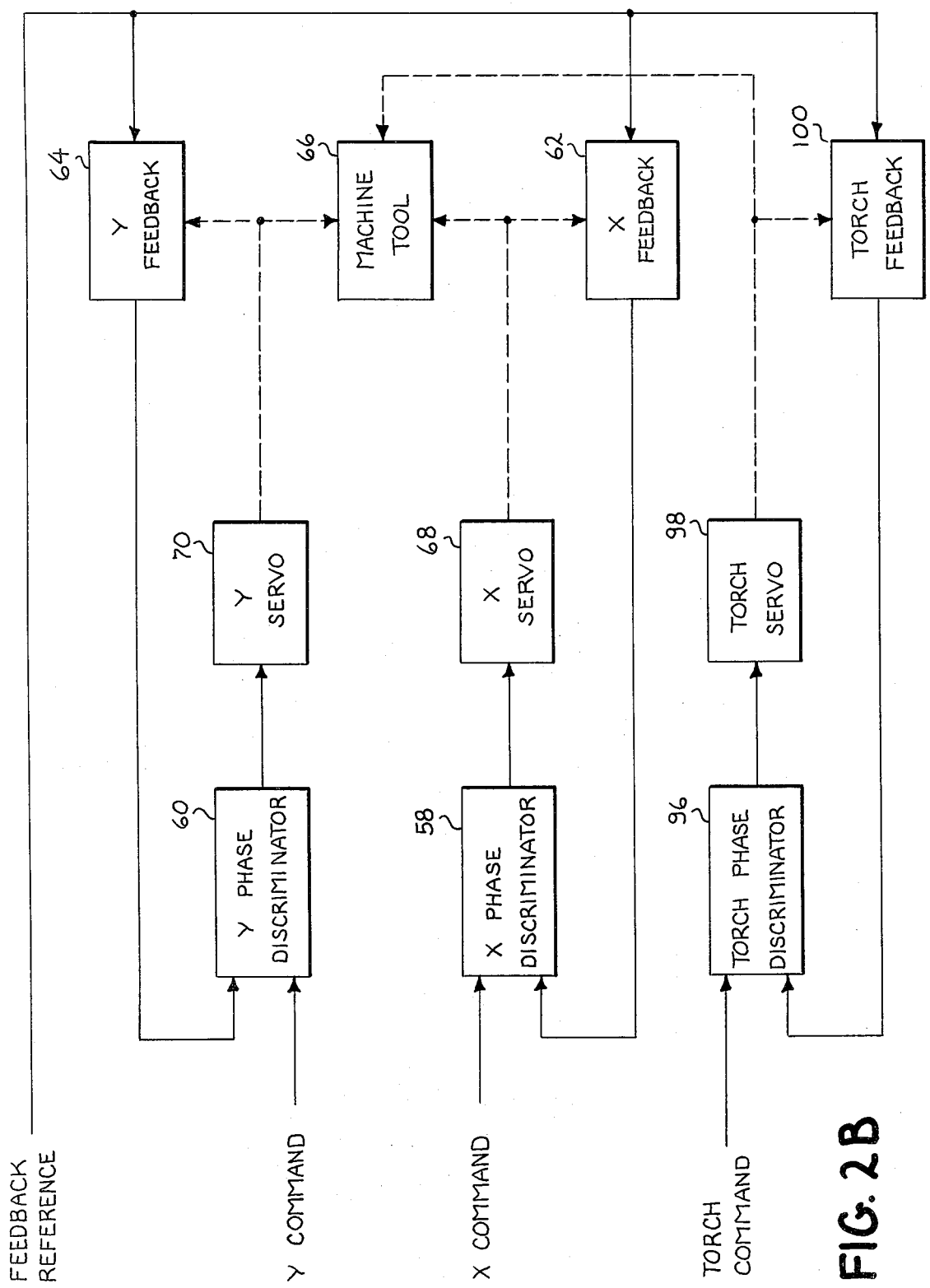

Turning now to FIG. 2, there is shown a detailed block diagram of a numerical contouring control system including alternate embodiments of the present invention.

The basic control system includes a master clock oscillator 40 which generates a substantially constant high frequency signal labeled C1 that is utilized throughout the numerical contouring system so as to synchronize the operation of various functions which are carried out therein.

The output of the clock oscillator 40 is fed to a pulse rate divider 42 which is used to break down the basic clock signal C1 into a variety of different time-varying signals for use within the system. The many signals generated by the pulse rate divider 42 will not be discussed at this time but rather will be referred to from time to time during the operation of the control system.

The first signal of interest is the output signal from the pulse rate divider 42 labeled C2. This signal is used in many places in the control system and may be, for example, a simple division of the basic output signal from the clock oscillator 40. Output signal C2 is fed to a first block labeled Manual Feedrate Override 44. The manual feedrate override 44 is a standard function provided in numerical contouring control systems and is generally a manually selectible function which allows the machine operator to vary the actual cutting speed of the machine if he feels that the cut presently being performed is taking place either too fast or too slow.

The output of the manual feedrate override 44 is fed to a velocity command 46. The velocity command 46 is used to control the speed of the commanded path. Thus, it has indicated as its input the letter F which, along with other information indicative of the desired machine operation, comes from data input and control unit 74. The data input and control unit 74 will generally include a tape or card reader with the basic program for the machine tool being stored on punched tape or cards or magnetic tape.

The output of the velocity command 46 is a signal labeled CV which is to represent the contouring velocity. This output signal will be a function of the output of the manual feedrate override 44 and the desired path speed which is programmed under the letter F. In general, it can be said that the frequency of the signal CV is directly proportional to the desired path speed.

The contouring velocity pulses from the velocity command 46 are fed to a contouring function generator 48. The basic function of the contouring function generator 48 is to resolve the contouring velocity pulses from the velocity command 46 into two components to be utilized to control the movable axes of the controlled machine tool 66.

The desired division which takes place in the contouring function generator 48 is, at least initially, determined by the input information which is delineated $X_o$ and $Y_o$, commonly referred to as the X and Y offset information and from path direction information, P, generated by the data input and control unit 74. A detailed description of the various types of functions which can be generated by the contouring function generator 48 is not appropriate in the description of the present invention but it will be appreciated that contouring function generators can take many different forms and the types of numerical function generators vary.

The output signals from the contouring function generator 48 are labeled $\Delta y$ and $\Delta x$ and represent the results of resolving the contouring velocity signal CV into the two components relating to the movement of the two machine axes. These two output pulse signals are fed to two distance counters, the X distance counter 50 and the Y distance counter 52. The function of the distance counters 50, 52 is to terminate a particular step when the contouring path has been traversed over the desired length. Once again, the data input and control unit will indicate the desired length of the path to be traversed with this information being noted with the symbols X and Y thereby indicating the amount of travel desired in the two respective axes of the controlled machine tool. The $\Delta x$ and $\Delta y$ pulses which were fed to the X and Y distance counters 50, 52 are also fed to an X command phase counter 54 and a Y command phase counter 56. At this point in the block diagram, these pulses have been referred to as the PX and PY signals but it will be understood that these two signals are selected from the two outputs of the contouring function generator 48 since they relate to the desired motion of the controlled machine tool. The X and Y command phase counters 54, 56 are known in the art with an example of a command phase counter for this type of operation being shown in FIG. 5 of U.S. Pat. No. 3,449,554, issued to L. U. C. Kelling and assigned to the assignee of this invention.

Briefly, the function of the command phase counters 54, 56 is to accept the input pulses PX and PY and generate therefrom two phase varying signals whose phase is proportional to the frequency and direction of the input pulses PX and PY. Thus, the phase varying output signal from the Y command phase counter 56 is a phase varying signal which is indicative of the desired position and velocity of the Y axis of the controlled machine tool. Similarly, the phase varying output signal from the X command phase counter 54 is a phase varying output signal indicative of the desired position and velocity of the other or X axis of the controlled machine tool.

The phase varying outputs of the X and Y command phase counters 54, 56 are fed, respectively, to an X discriminator 58 and a Y discriminator 60. The other inputs to the X and Y discriminator 58, 60 come, respectively, from an X feedback unit 62 and a Y feedback unit 64. The X and Y feedback units 62, 64 are mechanically or otherwise coupled to the controlled machine tool 66 so as to reflect the present position and velocity of these two controlled axes. The particular form which the X and Y feedback units 62, 64 may take is not important to the present invention but it will be noted in passing that there are a variety of such feedback units including rotary selsyns and linear transducers which would be excited by a reference signal from the pulse rate divider 42.

Thus, the function of the X discriminator 58 is to examine the difference between the desired position of the X axis (indicated by the output of the X command phase counter 54) and the actual position of the X axis (as indicated by the output of the X feedback unit 62). Similarly, the function of the Y discriminator 50 is to ascertain the difference between the desired position of the Y axis (as indicated by the phase varying output signal from Y command phase counter 56) and the actual position of the Y axis (as indicated by the output of the Y feedback unit 64).

The phase discrimination which takes place in the X and Y discriminators 58, 60 will result in generating some type of output signal which indicates the difference between the actual and the commanded positions of these two controlled axes. Thus, the output of the X discriminator 58 may be, for example, a DC signal whose amplitude is proportional to the present difference between the actual and commanded positions of the X axis. For this reason, the output of the X and Y discriminators 58, 60 are fed, respectively, to an X servo 68 and a Y servo 70. The function of the X and Y servos 68, 70 is to take the output of the X and Y discriminators 58, 60 and convert these outputs into power signals which are used to move the controlled machine tool axes. The types of servo units which can be employed vary widely from small motors excited by SCR drives to large hydraulic control systems employing hydraulic motors or cylinders. In any event, the output of the X servo 68 is fed to the machine tool 66 so as to cause the X axis of machine tool 66 to move in the desired direction. Similarly, the output of the Y servo 70 is also fed to the machine tool 66 so as to cause the Y axis of the controlled machine tool to move in the desired direction.

The system includes a tool radius function generator 72 which provides compensation for discrepancies in the cutting tool dimension. A detailed description of the tool radius function generator is provided in the above-mentioned U.S. Pat. No. 3,449,554. The tool radius function generator 72 accepts information, TR, related to the radius of the cutting tool. The tool radius information is generally preset by the machine tool operator on manually operable thumb wheel switches which, for the purposes of this discussion, have been included in the data input and control unit 74. The tool radius function generator 72 is controlled by TRFG control 76 which generates a pulse train, $\Delta \theta$, in which each pulse represents an incremental angular change of the tool path relative to the workpiece and the DIREC- TION signal indicates the direction of the angular change. The tool radius function generator 72 resolves the $\Delta\theta$ pulse train into two components RY and RX which are fed respectively to the Y command phase counter 56 and the X command phase counter 54. The Y command phase counter 56 combines the RY signal which the PY signal and the X command phase counter 54 combines the RX signal with the PX signal to position the workpiece so as to compensate for the tool radius. While executing a motion command, the angular change signal, $\Delta\theta$, is derived from the CV pulse train so that the tool slope is always aligned with the contouring slope and the direction signal is derived from path direction information P, from data input, and control unit 74.

The numerical contouring system also includes circuitry for automatically correcting the workpiece position if the slope of the new commanded path is different from the final slope of the old commanded path. This circuitry will only be briefly described as a more detailed description is provided in U.S. Pat. No. 3,684,874, issued to L. U. C. Kelling, and assigned to the assignee of this invention. A tool slope pulse generator 78 is connected to the tool radius function generator 72 so that the contents of the tool slope pulse generator 78 will be the same as the contents of the tool radius function generator 72. The tool slope pulse generator 78 generates first and second pulse trains TSX, TSY. These two pulse trains result from dividing the input signal C2 into two components which are proportional to the information stored within the tool slope pulse generator 78. This information, since it comes from the tool radius function generator 72, is at all times proportional to the present angle at which the compensating information is presently being offset relative to the two axes of the controlled machine tool. Similarly, the contour slope pulse generator 80 is connected to the contouring generator 48 so that the contents of the contour slope pulse generator 80 will be the same as the contents of the contouring function generator 48. The contour slope pulse generator 80 generates pulse trains PSX, PSY proportional to the contents of the contour slope pulse generator 80 which, since it gets its information from the contouring function generator 48, makes these two pulse trains representative of the slope of the contouring path being generated as the part program is executed. Slopes comparator 82 compares the TSX and TSY outputs of the tool slope pulse generator 78 to the PSX and PSY outputs of the contour slope pulse generator 80. If the slope of the contour path is different from the slope of the tool radius vector, the slopes comparator generates pulses in a direction and frequency proportional to that difference to the TRFG control 76. The TRFG control 76 then generates $\Delta\theta$, and DIRECTION signals which alter the contents of the tool radius function generator so that the tool radius vector is aligned with the initial slope of the newly commanded path.

It should be pointed out that although the above description refers to the alignment of the tool radius vector, there is no actual rotation of the tool head. The tool radius function generator 72 provides incremental position command signals RX, RY which, when combined with the PX and PY signals, positions the workpiece with respect to the tool so that the programmed shape is obtained with the particular size cutting tool employed. But if the cutting tool is a multiple torch flamecutter, it is also necessary to provide actual rotation of the flamecutter head so that the longitudinal axis of the torch remains perpendicular to the commanded path direction.

In one embodiment, the torch rotation control is obtained from the angular change, $\Delta\theta$, output and the angular direction signals from TRFG control 76. These connections are represented by dashed lines 84 and 86, respectively, to indicate that this is an alternate embodiment. In one typical numerical contouring control, each angular change pulse, $\Delta\theta$, represents one milliradian of tool radius vector rotation or, in other words, it will take about 6284 angular change pulses to rotate the tool radius vector through 360 degrees. In the embodiment of FIG. 2, there is shown a digital differential analyzer comprised of an integrand register 88, an adder-subtractor 90, and remainder register 92 for changing the scaling of the angular change pulses so that 360 degrees rotation of the tool radius vector will result in 2000 pulses. The scale change is accomplished by presetting the integrand register 88 with the number 318310. For one angular direction 318310 will be added to the number in the remainder register 92 upon the occurrence of each angular change, $\Delta\theta$, pulse and 2000 overflows will occur for 6284 pulses. For the other angular direction, 318310 is subtracted from the number in the remainder register 92 upon the occurrence of each angular change pulse and 2000 underflows will occur for 6284 $\Delta\theta$ pulses. In order that the scale changing circuit be completely reversible and symmetrical, the remainder register is preset to 500,000 at the zero degree point.

The over/under flow output of remainder register 92 drives one input of torch command phase counter 94. The other input of the torch command phase counter is driven by the DIRECTION output of TRFG control 76. The torch command phase counter is similar to the X and Y command phase counters 54, 56 in that the phase of the torch command signal will change in magnitude in accordance with the over/under flow pulses from remainder register 92 and in a direction in accordance with the DIRECTION signal from the TRFG control 76. Thus, the phase varying output signal from the torch command phase counter 94 is a phase varying signal which is indicative of the desired angular position of the torch head. The torch command phase counter 94 drives one input of a torch phase discriminator 96 while the other input of the torch phase discriminator is driven by the torch feedback unit 100. The torch feedback unit 100 is mechanically or otherwise coupled to the flamecutter head of machine tool 66 so as to reflect the present angular position of the flamecutter head. Similar to the X and Y feedback units 62, 64, the torch feedback unit 100 is also driven by the feedback reference signal from pulse rate divider 42. The torch phase discriminator examines the difference between the commanded angle of rotation, as indicated by the output of the torch command phase counter and the actual angle of the flamecutter head, as indicated by the output of the torch feedback unit 100 and generates a signal for the torch servo 98 which will drive the flamecutter head operation; the direction so as to reduce the torch phase discriminator 96 difference signal.

Although the system just described will operate to control the angular position of the flamecutter head, it has been found that the system loses accuracy when very small tool radius, TR, compensation inputs are used. This accuracy disadvantage can be eliminated by using an alternate preferred embodiment also illustrated in FIG. 2a, to control the flamecutter head rotation. The alternate embodiment includes as control elements torch rotation function generator 104, TRFG control 102, torch slope pulse generator 108, contour slope pulse generator 106 and slopes comparator 110. These elements function substantially the same as their respective counterparts, elements 72, 76, 78, 80, and 82. Thus, when the flamecutter is at a known reference angle, the torch rotation function generator 104 is preset with the number 9999 which, for a four decimal digit function generator, represents the maximum input number. The torch rotation function generator 104 is controlled by an angular change signal $\Delta\theta$ and a DIRECTION signal generated by TRFG control 102. Since the torch rotation function generator is merely keeping track of torch rotation angle there are no compensation output signals to the X and Y command phase counter 54, 56. The operation of TRFG control 102 is similar to the operation of TRFG control 76. When the control is executing a commanded path, the angular change pulses $\Delta\theta$ generated by TRFG control 102 are synchronized with the angular rotation of the contouring path and slopes comparator 82 controls the generation of $\Delta\theta$ pulses in order to automatically rotate the flamecutter head so that the longitudinal axis of the flamecutter head is perpendicular to the contour slope at the start of a newly commanded contour path. The torch slope pulse generator 108 responds to information in the torch rotation function generator 104 to generate pulse trains TOSX and TOSY representative of the torch slope and contour slope pulse generator 106 responds to information in the contouring function generator to generate pulse trains PSX, PSY representative of the slope of the contouring path. Slopes comparator 110 detects any difference between the contour slope and the torch slope and provides a signal to TRFG control 102 which puts out appropriate DIRECTION and angular change signals which alters the information in the torch rotation function generator until the torch slope equals the contour slope. The output signals of TRFG control 102 are used to control add-subtract circuit 90 and the torch command phase counter 94.

Since the torch rotation function generator 104 is independent of the magnitude of tool radius, the torch command accuracy is maintained for all values of tool radius compensation.

Since angular direction and change signals generated by TRFG controls 76, 102 maintain a fixed relationship between the tool radius slope and the contour slope as a curvilinear path is executed these signals are used to continuously maintain a ninety degree angle between the contouring path direction and the longitudinal axis of the flamecutter torches. Furthermore, since the slopes comparators 76, 110 cause angular change and direction signals to be present when the initial slope of a newly commanded path is different from the final slope of the prior commanded path, these signals will automatically rotate the flamecutter head so that the longitudinal axis of the flamecutter torches is perpendicular to the initial slope of the newly commanded path. Thus, it is not necessary to program separate flamecutter torch rotation commands on the tape.

While the present invention has been described with reference to a specific embodiment thereof, it will be obvious to those skilled in the art that various changes and modifications may be made without departing from the invention in its broader aspects. For example, although the numerical contouring control has been described as a special purpose computer, it is apparent that the various counters and registers employed could be locations in a memory and that the counting, addition, comparing, and sensing functions can be performed by the instructions or series of instructions in a general purpose computer.

What is claimed as new and desired to be secured by letters patent of the United States is:

1. A numerical contouring control for producing relative motion between a flamecutting tool and a workpiece along a path and for maintaining a fixed angle between an axis of the flamecutting head and the path direction comprising:
    a. input information means for commanding the speed of said relative motion and first and second directional components of the commanded path to be followed along respective axes;
    b. a clock oscillator for synchronizing system operation;
    c. a velocity command generator coupled to the input information means and the clock oscillator for producing contouring velocity pulses at a rate indicative of the speed of said relative motion;
    d. a contouring function generator coupled to the velocity command generator and the input information means for resolving the contouring velocity pulses into the first and second components of pulses having respective rates which indicate the direction of the commanded path relative to axes;
    e. control means coupled to the velocity command generator and the information means for generating a train of pulses wherein each pulse represents an incremental angular change of the path direction and a signal indicating the direction of angular change;
    f. means responsive to the first component of pulses for effecting movement along one of said two axes;
    g. means responsive to the second component of pulses for effecting movement along the other of said two axes; and
    h. means responsive to the angular change pulses and the angular direction signal for effecting rotation of the flamecutting head.

2. A numerical contouring control for producing relative motion between a flamecutting tool and a workpiece along a path and for maintaining a fixed angle between an axis of the flamecutting head and the path direction comprising:
    a. input information means for commanding the speed of said relative motion and first and second directional components of the commanded path to be followed along respective axes;
    b. a clock oscillator for synchronizing system operation;
    c. a velocity command generator coupled to the input information means and the clock oscillator for producing contouring velocity pulses at a rate indicative of the speed said relative motion;
    d. a contouring function generator coupled to the velocity command generator and the input information means for resolving the contouring velocity pulses into the first and second components of pulses having respective rates which indicate the direction of the commanded path relative to axes;

e. compensating information input means for indicating the required amount of compensation resulting from deviation in cutting tool dimensions;

f. control means coupled to the velocity command generator and the information means for generating a train of pulses wherein each pulse represents an incremental angular change of the path direction and a signal indicating the direction of angular change;

g. a compensating function generator responsive to the compensating input information, the angular change pulses and the angular direction signal for generating first and second compensating components of pulses which indicate the direction of compensation relative to the axes;

h. comparison means responsive to information stored in the contouring function generator representing the commanded path direction and to information stored in the compensating function generator representing the compensation direction for controlling the angular direction and change signals so that the compensation direction is aligned with the commanded path direction;

i. means coupled to said contouring function generator and said compensating function generator for combining said first components of pulses to produce first result pulses for effecting movement along one of said two axes;

j. means coupled to said contouring function generator for combining said second components of pulses to produce second resultant pulses for effecting movement along the other of said two axes; and k. means responsive to the angular change pulses and the angular direction signal for effecting rotation of the flamecutting head.

3. A numerical contouring control for producing relative motion between a flamecutting tool and a workpiece along a path and for maintaining a fixed angle between an axis of the flamecutting head and the path direction comprising:

a. input information means for commanding the speed of said relative motion and first and second directional components of the commanded path to be followed along respective axes;

b. a clock oscillator for synchronizing system operation;

c. a velocity command generator coupled to the input information means and the clock oscillator for producing contouring velocity pulses at a rate indicative of the speed of said relative motion;

d. a contouring function generator coupled to the velocity command generator and the input information means for resolving the contouring velocity pulses into the first and second components of pulses having respective rates which indicate the direction of the commanded path relative to axes;

e. compensating information input means for indicating the required amount of compensation resulting from deviation in cutting tool dimensions.

f. first control means coupled to the velocity command generator and the information means for generating a train of pulses wherein each pulse represents an incremental angular change of the path direction and a signal indicating the direction of angular change;

g. a compensating function generator responsive to the compensating input information, the first control means angular change pulses, and angular direction signal for generating first and second compensating components of pulses which indicate the direction of compensation relative to the axes;

h. first comparison means responsive to information stored in the contouring function generator representing the commanded path direction and to information stored in the compensating function generator representing the compensation direction for controlling the first control means angular direction and change signals so that the compensation direction is aligned with the commanded path direction;

i. means coupled to said contouring function generator and said compensating function generator for combining said first components of pulses to produce first result pulses for effecting movement along one of said two axes;

j. means coupled to said contouring function generator and said compensating function generator for combining said second components of pulses to produce second resultant pulses for effecting movement along the other of said two axes;

k. second control means coupled to the velocity command generator and the information means for generating a train of pulses wherein each pulse represents an incremental angular change of the path direction and a signal indicating the direction of angular change;

l. flamecutter rotation function generator responsive to the input information means, and the second control means angular direction signal and angular change signal for keeping track of the commanded flamecutter head angle;

m. second comparison means responsive to information stored in the contouring function generator representing the commanded path direction and to information stored in the flamecutter rotation function generator representing the flamecutter rotation direction for controlling the second control means angular direction and change signals so that the compensation direction is aligned with the commanded path direction; and n. means responsive to the second control means angular change pulses and angular direction signal for effecting rotation of the flamecutting head.

* * * * *